United States Patent [19]

Balakirev et al.

[11] 4,395,289

[45] Jul. 26, 1983

[54] PROCESS FOR PRODUCING CONCRETE

[75] Inventors: Anatoly A. Balakirev; Boris A. Balakirev, both of Chimkent, U.S.S.R.

[73] Assignee: Kazakhsky Khimiko-Tekhnologichesky Institut, Chimkent, U.S.S.R.

[21] Appl. No.: 327,055

[22] Filed: Dec. 3, 1981

[51] Int. Cl.$^3$ .............................................. C04B 7/02
[52] U.S. Cl. .................................. 106/98; 106/288 B
[58] Field of Search ...................... 106/97, 98, 288 B; 501/80, 81, 82, 129

[56] References Cited

U.S. PATENT DOCUMENTS 3,909,283  9/1975  Warnke ................................. 501/81

Primary Examiner—James Poer
Attorney, Agent, or Firm—Robert E. Burns; Emmanuel J. Lobato; Bruce L. Adams

[57] ABSTRACT

A process for producing concrete comprising mixing barkhan sand with a fuel selected from the group consisting of a liquid fuel and a solid fuel, and a plastic binder selected from the group consisting of clay, loess, loam and a surfactant liquifying the charge composition and reducing its water consumption, the component being present in the following proportions, percent by weight:

barkhan sand: 95 to 30
fuel: 3 to 20
plastic binder: 2 to 60

The resulting charge is granulated, the granules are calcined at a temperature ranging from 1,000° to 1,600° C. The calcined material is crushed. The crushed material is mixed with cement and water, cement being used in an amount of from 10 to 100% by mass of the calcined material and water—in an amount of from 10 to 60% by mass of the total of the calcined material and cement.

15 Claims, No Drawings

PROCESS FOR PRODUCING CONCRETE

The present invention relates to processes for producing concrete.

FIELD OF THE INVENTION

Concretes are widely used in construction. They should meet a number of requirements: thus, they should have high mechanical strength and adequately low deformation characteristics: shrinkage and creep. These properties are due to the presence of a large-size aggregate in their composition, i.e. crushed stone, gravel which act as a matrix and a fine aggregate-large-size sand with gradation factor (Gf) above 1.

In certain countries there are substantially unlimited resources of fine barkhan sands with Gf below 1, but scarce stock of large-size crushed stone, gravel and large-size sands as aggregates for concrete.

The countries carrying out construction works in the areas of barkhan sand location have to use rather expensive crushed stone, gravel and large-size sands shipped from more distant regions.

For such countries the solution of the problem of concrete production with the use of fine barkhan sands as aggregates is very urgent.

BACKGROUND OF THE INVENTION

A process for producing concrete is known in the art using, as an aggregate, fine barkhan sands (cf. O. A. Gershberg "Technology of Concrete and Reinforced-Concrete Articles", Moscow, Strojizdat Publishing House, 1971). This process contemplates production of concrete by mixing cement, barkhan sand and water in specified proportions.

The process is rather simple, but concrete produced thereby feature a low mechanical strength due to a high specific surface area of the sand.

Another process is known in the art for the production of concrete, wherein sand is first screened to fractions and then enriched with fractions having larger particle size. Thereafter sand is mixed with cement and water (cf. Yu. M. Bazehenov "Methods for determination of composition of concrete of different kinds", Moscow, Strojizdat Publishing House, 1975). This process has a limited application, since it contemplates the use of sands having only large-size fractions. Furthermore, concrete produced by this process has a high bulk mass and an insufficient mechanical strength.

A process for producing a light-weight concrete, is known in the art wherein a large-size aggregate: crushed stone, gravel is first prepared. To this end, burnt and dump rocks are crushed and intermixed with a plastic clay and coal at the following proportions of the components, percent by weight:
- dump rock: 8 to 25
- burnt rock: 50 to 72
- plastic clay: 12 to 27
- coal: 3 to 9

The thus-prepared charge is granulated, roasted, crushed and screened. Thereafter, the resulting material is mixed with cement and water (cf. I. A. Ivanov "Technology of light-weight concretes with artificial porous aggregates", Moscow, Strojizdat Publishing House, 1974).

The use is also known of loess in the charge compositions for the manufacture of a coarse aggregate-crushed stone, gravel having, for example, the following composition, percent by weight:
- loess: 90 to 94
- ground apatite: 3 to 7
- liquid fuel: 3

(cf. I. I. Moroz "Technology of Building Ceramics", Kiev, Visha Schkola Publishing House, 1972).

However thus-produced concretes have insufficient mechanical strength, since the charge employed for the production of a coarse aggregate has a great amount of dump and burnt rocks and loess.

SUMMARY OF THE INVENTION

It is an object of the present invention to provide a process for producing concrete which makes it possible to produce a light-weight durable concrete meeting the requirements imposed on concretes produced with the use of cheap and readily available raw material—barkhan sands.

This and other objects of the present invention are accomplished by a process for the production of concrete which comprises mixing barkhan sand with a fuel selected from the group consisting of a liquid fuel and a solid fuel, and a plastic binder selected from the group consisting of clay, loess, loam and surfactants possessing liquifying and water-consumption reducing properties at the following proportions of the components, percent by weight:
- barkhan sand: 95 to 30
- fuel: 3 to 20
- plastic binder: 2 to 60;

the thus-prepared charge is granulated, the granules are calcined at a temperature within the range of from 1,000° to 1,600° C.; the calcined material is crushed; the crushed material is mixed with cement and water using cement in an amount within the range of from 10 to 100% by weight of the calcined material and water—in an amount of from 10 to 60% by weight of the mixture of the calcined material and cement.

As the liquid fuel, use can be made of diesel fuel, mazout, coal-tar, lignite, peat and shale resins as well as rosin.

Diesel fuel comprises a fuel for diesel engines, mazout is the residue resulting from petroleum refining; coal-tar resin can be produced from coking of coal; lignite resin—as a result of semi-coking or gasification of lignite; peat resin—from low-temperature coking or gasification of peat; shale resin—from low-temperature coking or gasification of shales; rosin—as a result of dry distillation of wood.

The above-mentioned substances employed as a fuel can be used both separately or in any possible combination with each other.

As the solid fuel, use can be made of coal, lignite, anthracite, semi-anthracite, coke.

As has been mentioned hereinbefore, the plastic binder can be clays, loess, loams and surface-active substances possessing liquifying properties and reducing water consumption. As such surfactants, use can be made of:

naphtha soap—sodium soaps of water-insoluble organic acids recovered from wastes obtained from wastes of alkali purification of kerosene, gasoline and solaroil distillates of petroleum;

acidol—petroleum acids recovered from alkali wastes obtained from purification of oil and solaroil distillates;

resin neutralized air-occluding produced from abietic resin by treatment thereof with caustic soda:

methylhydrosiloxane polymers of the general formula:

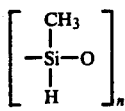

wherein n=15 to 20 water-alcohol solutions of sodium ethylsiliconate of the general formula:

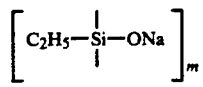

wherein m=1-2, water-alcohol solutions of sodium methylsiliconate of the general formula:

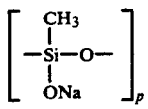

wherein p=1-2;

sulphite-alcohol slops and sulphite-yeast mash—by-products obtained from processing of sulphate-pulp liquors into ethanol and yeast consisting mainly of calcium salts of lignosulphonic acids.

The above-mentioned methylhydrosiloxane polymer comprises a colourless or light-yellow hydrophobizing liquid; water-alcohol solutions of sodium ethylsiliconate and sodium methylsiliconate are also hydrophobizing liquids from yellow to light-brown colour.

The above-mentioned substances employed as a plastic binder can be used both individually and in various combinations with one another.

The plastic binder clay, loess, loam, above-mentioned surface-active substances in the amounts falling within the range specified above provides for the opportunity of granulation of the mixture of sand and fuel. Increasing the amount of the plastic binder above the upper limit fails to improve physico-mechanical characteristics of crude granules.

Introduction of the plastic binder in an amount below the above-mentioned lower limit does not provide for granulation of the materials. Barkhan sand in the amounts within the range specified hereinabove together with the plastic binder contributes to a better sintering of the charge and production of a durable calcined material.

The fuel introduced in the bove-specified proportions ensures the possibility of sintering of the charge.

The use of the fuel above the upper limit specified hereinabove affects physico-mechanical characteristics of the resulting concrete.

In the amounts below the lower limit the fuel does not provide for the possibility of the production of a light-weight concrete.

The process according to the present invention makes it possible to efficiently employ fine desert sands—barkhan sands in the manufacture of concretes. This process also makes it possible to improve physico-mechanical characteristics of barkhan sand as an aggregate for concrete. In particular, there is provided the opportunity of a drastic improvement of the particle size distribution in barkhan sand and thus obtaining a fractionated material with a particle size of fractions of up to 40 mm and above with a volume bulk mass of from 400 to 1,200 kg/m$^3$ and mechanical strength of up to 50 kgf/cm$^2$ which is superior to that of known light-weight aggregates.

The process according to the present invention results in the manufacture, from fine barkhan sands, of light-weight durable concretes with a wide range of variation of their volume mass and mechanical strength of up to 500 kgf/cm$^2$ and above without over-consumption of cement.

In the manufacture of light-weight concretes the necessity of shipment of large-size or coarse aggregates to the regions having vast resources of barkhan sands; is eliminated savings are also provided due to minimized cost of hardly-available argillaceous rocks.

DETAILED DESCRIPTION OF THE INVENTION

The process for producing concrete according to the present invention is simple and can be performed in the following manner.

In a mixer there are intermixed barkhan sand, a fuel and a plastic binder. The prepared charge is granulated on a plate-type granulator. The granulated material is sintered in an agglomeration machine. After cooling the sintered material is crushed, fractionated, mixed with cement, water and articles are moulded therefrom.

For a better understanding of the present invention the following specific examples are given hereinbelow by way of illustration.

EXAMPLE 1

A charge is prepared from the following components, percent by weight:

barkhan sand: 50
coal: 20
clay: 30.

The resulting charge is granulated, calcined in an agglomeration machine at the temperature of 1,250° C. The calcined material is crushed and screened. The resulting calcined material has the following physico-mechanical characteristics: Volume bulk mass of the fraction with the particle size (mm):

20–40: 400 to 550 kg/m$^3$
10–20: 400 to 600 kg/m$^3$
5–10: 500 to 700 kg/m$^3$
1.25–5: 600 to 800 kg/m$^3$
below 1.25: 700 to 1,000 kg/m$^3$.
Compression strength, kgf/cm$^2$: 28 to 38
Frost-resistance, mass loss, %: 0.4
Silicate decomposition, %: 0.6.

The calcined material is intermixed with cement taken in the amount of 34% by mass of the calcined material. To the resulting mixture there is added water in the amount of 17% by weight of the mixture of the calcined material and cement.

The resulting concrete has the following physico-mechanical characteristics:
compression strength after 28-days' hardening under normal temperature-moisture conditions (t=20° C.±2, H=95%), kgf/cm$^2$: 270
volume mass, kg/m$^3$: 1,400.

EXAMPLE 2

A charge is prepared from the following components, percent by weight:
 barkhan sand: 60
 coal: 7
 mazout: 3
 clay: 20
 loess: 10.

The resulting charge is granulated, calcined in an agglomeration machine at the temperature of 1,300° C. The calcined material is crushed and screened. The resulting calcined material has the following physico-mechanical properties:
 Volume bulk mass of fractions with the particle size (mm):
  20–40: 450 to 550 kg/m$^3$
  10–20: 500 to 600 kg/m$^3$
  5–10: 550 to 700 kg/m$^3$
  1.25–5: 600 to 800 kg/m$^3$
  below 1.25: 800 to 1,000 kg/m$^3$;
 Compression strength, kgf/cm$^2$: 28 to 38
 Frost-resistance, mass loss, %: 0.4
 Silicate decomposition, %: 0.6.

The calcined material is mixed with cement in the amount of 10% by weight of the calcined material. To the resulting mixture water is added in the amount of 10% by mass of the mixture of the calcined material and cement.

The resulting concrete has the following physico-mechanical characteristics:
 compression strength after 28-days' hardening under normal temperature-humidity conditions, kgf/cm$^2$: 150
 volume mass, kg/m$^3$: 1,900.

EXAMPLE 3

A charge is prepared which has the following composition, percent by weight:
 barkhan sand: 30
 lignite: 10
 loam: 60.

The thus-prepared charge is granulated, calcined in an agglomeration machine at the temperature of 1,000° C. The calcined material is crushed and screened. The resulting calcined material has the following physico-mechanical properties:
 Volume bulk mass of fractions with the particle size (mm):
  20–40: 450 to 550 kg/m$^3$
  10–20: 0.500 to 600 kg/m$^3$
  5–10: 550 to 700 kg/m$^3$
  1.25–5: 600 to 800 kg/m$^3$
  below 1.25: 800 to 1,000 kg/m$^3$
 Compression strength, kgf/cm$^2$: 14 to 22
 Frost-resistance, mass loss, %: 0.9
 Silicate decomposition, %: 0.8.

The calcined material is mixed with cement taken in the amount of 100% by mass of the calcined material. To the resulting mixture water is added in the amount of 60% by mass of the mixture of the calcined material and cement.

The resulting concrete has the following physico-mechanical characteristics:
 compression strength after 28-days' hardening under normal conditions of temperature and moisture, kgf/cm$^2$: 50
 volume mass, kg/m$^3$: 900.

EXAMPLE 4

A charge is prepared which has the following composition, percent by weight:
 barkhan sand: 43
 coke: 7
 loess: 50.

The resulting charge is granulated, calcined in an agglomeration machine at the temperature of 1,600° C. The calcined material is crushed and screened. The resulting calcined material has the following physico-mechanical characteristics:
 Volume bulk mass of fractions with the particle size (mm):
  20–40: 600 to 650 kg/m$^3$
  10–20: 650 to 700 kg/m$^3$
  5–10: 700 to 750 kg/m$^3$
  1.25–5: 750 to 800 kg/m$^3$
  below 1.25: 900 to 1,000 kg/m$^3$.
 Compression strength, kgf/cm$^2$: 30 to 46
 Frost-resistance, mass loss, %: 0.5
 Silicate decomposition, %: 0.8.

The calcined material is mixed with cement in the amount of 40% by mass of the calcined material. To the resulting blend water is added in the amount of 17% by mass of the mixture of the calcined material and cement.

The final concrete has the following physico-mechanical characteristics:
 compression strength after 28-days' hardening under normal conditions of temperature and humidity, kgf/cm$^2$: 330
 volume mass, kg/m$^3$: 1,600.

EXAMPLE 5

A charge is prepared which has the following composition, percent by weight:
 barkhan sand: 95
 diesel fuel: 3
 acidol: 2.

The resulting charge is granulated, calcined in an agglomeration machine at the temperature of 1,400° C. The calcined material is crushed and screened. The resulting calcined material has the following physico-mechanical properties:
 Volume bulk mass of fractions with the particle size (mm):
  20–40: 650 to 700 kg/m$^3$
  10–20: 700 to 750 kg/m$^3$
  5–10: 750 to 800 kg/m$^3$
  1.25–5: 800 to 950 kg/m$^3$
  below 1.25: 1,000 to 1,100 kg/m$^3$
 Compression strength, kgf/cm$^2$: 35 to 47
 Frost-resistance, mass loss, %: 0.4
 Silicate decomposition, %: 0.6.

The calcined material is mixed with cement in the amount of 39% by mass of the calcined material. To the resulting mixture water is added in the amount of 16% by mass of the mixture of the calcined material and cement.

The final concrete has the following physico-mechanical characteristics:
 compression strength after 28-days' hardening under normal conditions of temperature and humidity, kgf/cm$^2$: 380
 volume mass, kg/m$^3$: 1,800.

EXAMPLE 6

A charge is prepared which has the following composition, percent by weight:

barkhan sand: 58
mazout: 5
loess: 35
acidol: 2.

The resulting charge is granulated, calcined in an agglomeration machine at the temperature of 1,400° C. The calcined material is crushed and screened. The resulting calcined material has the following physico-mechanical properties:

Volume bulk mass of fractions with the particle size (mm):
20–40: 650 to 700 kg/m³
10–20: 700 to 750 kg/m³
5–10: 750 to 800 kg/m³
1.25–5: 800 to 950 kg/m³
below 1.25: 1,000 to 1,100 kg/m³;
Compression strength, kgf/cm²: 40 to 48
Frost-resistance, mass loss, %: 0.4
Silicate decomposition, %: 0.6.

The calcined material is mised with cement in the amount of 38% by mass of the calcined material. To the resulting blend water is added in the amount of 19% by mass of the total of the calcined material and cement.

The resulting concrete has the following physico-mechanical characteristics:
compression strength under normal conditions of temperature and humidity after 28-days' hardening, kgf/cm²: 405
volume mass, kg/m³: 1,700

EXAMPLE 7

A charge is prepared which has the following composition, percent by weight:
barkham sand: 78
coal: 20
surfactant—sulphite-yeast mash: 2.

The resulting charge is granulated, calcined in an agglomeration machine at the temperature of 1,300° C. The calcined material is crushed and screened. The resulting calcined material has the following physico-mechanical properties:

Volume bulk mass of fractions with the particle size, mm:
20–40: 450 to 550 kg/m³
10–20: 500 to 600 kg/m³
5–10: 550 to 700 kg/m³
1.25–5: 600 to 800 kg/m³
below 1.25: 800 to 1,000 kg/m³
Compression strength, kgf/cm²: 28 to 38
Frost-resistance, mass loss, %: 0.6
Silicate decomposition, %: 0.7.

The calcined material is mixed with cement in the amount of 38% by mass of the calcined material. To the resulting mixture water is added in the amount of 18% by mass of the total of the calcined material and cement.

The final concrete has the following physico-mechanical characteristics:
compression strength after 28-days' hardening under normal temperature and humidity conditions, kgf/cm²: 310
Volume mass, kg/m³: 1,400

EXAMPLE 8

A charge is prepared which has the following composition, percent by weight:
barkhan sand: 78
coal: 18
methylhydrosiloxane polymer of the general formula:

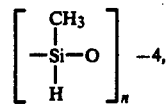

wherein n=15: 4.

The resulting charge is granulated, calcined in an agglomeration machine at the temperature of 1,300° C. The calcined material has the following physico-mechanical properties:

Volume bulk mass of fractions with the particle size (mm):
20–40: 450 to 550 kg/m³
10–20: 500 to 600 kg/m³
5–10: 550 to 700 kg/m³
1.25–5: 600 to 800 kg/m³
below 1.25: 800 to 1,000 kg/m³
Compression strength, kgf/cm²: 30 to 39
Frost-resistance, mass loss, %: 0.6
Silicate decomposition, %: 0.7.

The use of a methylhydrosiloxane polymer of the general formula:

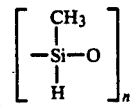

wherein n=20 has given a similar result.

The calcined material is mixed with cement in the amount of 38% by mass of the calcined material. To the resulting mixture water is added in the amount of 18% by the total of the calcined material and cement.

The final concrete has the following physico-mechanical characteristics:
compression strength after 28-days' hardening under normal temperature and humidity conditions, kgf/cm²: 315
volume mass, kg/m³: 1,400.

EXAMPLE 9

A charge is prepared which has the following composition, percent by weight:
barkhan sand: 79
anthracite: 16
water-alcohol solution of sodium ethylsiliconate of the general formula:

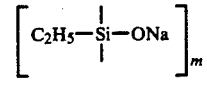

wherein m=1: 5.

The prepared charge is granulated, calcined in an agglomeration machine at the temperature of 1,300° C. The calcined material is crushed and screened. The resulting calcined material has the following physico-mechanical properties:

Volume bulk mass of fractions, particle size (mm):
20–40: 500 to 550 kg/m³
10–20: 550 to 600 kg/m³
5–10: 600 to 700 kg/m³
1.25–5: 700 to 800 kg/m³
below 1.25: 800 to 1,000 kg/m³
Compression strength, kgf/cm²: 30 to 38
Frost-resistance, mass loss, %: 0.6

Silicate decomposition, %: 0.7.

The use of a water-alcohol solution of sodium ethylsiliconate of the general formula:

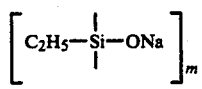

wherein m=2 has given a similar result.

The calcined material is mixed with cement in the amount of 37% by mass of the calcined material. To the resulting mixture water is added in the amount of 18% by mass of the total of the calcined material and cement.

The final concrete has the following physico-mechanical characteristics:
 compression strength after 28-days' hardening under normal temperature and humidity conditions, kgf/cm$^2$: 320
 volume mass, kg/m$^3$: 1,450.

EXAMPLE 10

A charge is prepared which has the following composition, percent by weight:
 barkhan sand: 77
 semi-anthracite: 17
 water-alcohol solution of sodium methylsiliconate of the general formula:

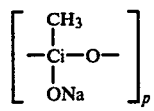

wherein p=1: 6.

The resulting charge is granulated, calcined in an agglomeration machine at the temperature of 1,300° C. The calcined material is crushed and screened. The resulting calcined material has the following physico-mechanical properties:
 Volume bulk mass of fractions with the particle size (mm):
  20–40: 500 to 550 kg/m$^3$
  10–20: 550 to 600 kg/m$^3$
  5 to 10: 600 to 700 kg/m$^3$
  1.25–5: 700 to 800 kg/m$^3$
  below 1.25: 800 to 1,000 kg/m$^3$
 Compression strength, kgf/cm$^2$: 30 to 38
 Frost-resistance-mass loss, %: 0.7
 Silicate decomposition, %: 0.7.

The use of a water-alcohol solution of sodium methylsiliconate of the formula:

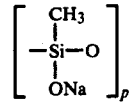

wherein p=2 has given a similar result.

The calcined material is mixed with cement in the amount of 47% by mass of the calcined material. To the resulting mixture water is added in the amount of 22% by mass of the total of the calcined material and cement.

The final concrete has the following physico-mechanical characteristics:
 compression strength after 28-days' hardening under normal temperature and humidity conditions, kgf/cm$^2$: 415
 volume mass, kg/m$^3$: 1,800

EXAMPLE 11

A charge is prepared which has the following composition, percent by weight:
 barkhan sand: 87
 coal-tar resin: 6
 sulphite-alcohol slops: 7.

The resulting charge is granulated, calcined in an agglomeration machine at the temperature of 1,300° C. The calcined material is crushed and screened. The resulting calcined material has the following physico-mechanical characteristics:
 Volume bulk mass of fractions with the particle size (mm):
  20–40: 500 to 550 kg/m$^3$
  10–20: 550 to 600 kg/m$^3$
  5–10: 650 to 700 kg/m$^3$
  1.25–5: 750 to 800 kg/m$^3$
  below 1.25: 900 to 1,100 kg/m$^3$
 Compression strength, kgf/cm$^2$: 35 to 45
 Frost-resistance, mass loss, %: 0.5
 Silicate decomposition, %: 0.7.

The calcined material is mixed with cement in the amount of 38% by mass of the calcined material. To the resulting mixture water is added in the amount of 18% by weight of the total of the calcined material and cement.

The final concrete has the following physico-mechanical characteristics:
 compression strength after 28-days' hardening under normal temperature and humidity conditions, kgf/cm$^2$: 320
 volume mass, kg/m$^3$: 1,500

EXAMPLE 12

A charge is prepared which has the following composition, percent by weight:
 barkhan sand: 86
 lignite resin: 7
 naphtha soap: 7.

The resulting charge is granulated, calcined in an agglomeration machine at the temperature of 1,300° C. The calcined material is crushed and screened.

The resulting calcined material has the following physico-mechanical characteristics:
 Volume bulk means of fractions with the particle size (mm):
  20–40: 500 to 550 kg/m$^3$
  10–20: 550 to 600 kg/m$^3$
  5–10: 650 to 700 kg/m$^3$
  1.25–5: 750 to 800 kg/m$^3$
  below 1.25: 900 to 1,100 kg/m$^3$
 Compression strength, kgf/cm$^2$: 35 to 45
 Frost-resistance, mass loss, %: 0.5
 Silicate decomposition, %: 0.7.

The calcined material is mixed with cement in the amount of 48% by mass of the calcined material. To the resulting mixture water is added in the amount of 18% by mass of the total of the calcined material and cement.

The final concrete has the following physico-mechanical characteristics:
 compression strength after 28 days' hardening under normal temperature and humidity conditions, kgf/cm$^2$: 520
 volume mass, kg/m$^3$: 1,900.

EXAMPLE 13

A charge is prepared which has the following composition, percent by weight:
barkhan sand: 90
peat resin: 5
acidol: 5.

The resulting charge is granulated, calcined in an agglomeration machine at the temperature of 1,300° C. The calcined material is crushed and screened.

The resulting calcined material has the following physico-mechanical characteristics:
Volume bulk mass of fractions with the particle size (mm):
20–40: 500 to 550 kg/m$^3$
10–20: 550 to 600 kg/m$^3$
5–10: 600 to 700 kg/m$^3$
1.25–5: 750 to 800 kg/m$^3$
below 1.25: 900 to 1,100 kg/m$^3$
Compression strength, kgf/cm$^2$: 35 to 45
Frost-resistance, mass loss, %: 0.5
Silicate decomposition, %: 0.7.

The calcined material is mixed with cement in the amount of 38% by mass of the calcined material. To the resulting mixture water is added in the amount of 18% by mass of the total of the calcined material and cement.

The final concrete has the following physico-mechanical characteristics:
compression strength under normal temperature and humidity after 28-days' hardening, kfg/cm$^2$: 320
Volume mass, kg/m$^3$: 1,500.

EXAMPLE 14

A charge is prepared which has the following composition, percent by mass:
barkhan sand: 76
shale resin: 18
resin, neutralized and air-occluding prepared from abietic resin by treatment thereof with caustic soda: 6.

The resulting charge is granulated, calcined in an agglomeration machine at the temperature of 1,300° C. The calcined material is crushed and screened. The resulting calcined material has the following physico-mechanical properties:
Volume bulk mass of fractions with the particle size (mm):
20–40: 500 to 550 kg/m$^3$
10–20: 550 to 600 kg/m$^3$
5–10: 600 to 700 kg/m$^3$
1.25–5: 750 to 800 kg/m$^3$
below 1.25: 900 to 1,100 kg/m$^3$
Compression strength, kgf/cm$^2$: 38 to 50
Frost-resistance, mass loss, %: 0.5
Silicate decomposition, %: 0.7.

The calcined material is mixed with cement in the amount of 38% by mass of the calcined material. To the resulting mixture water is added in the amount of 18% by mass of the total of the calcined material and cement.

The final concrete has the following physico-mechanical characteristics:
Compression strength after 28-days' hardening under normal temperature and humidity conditions, kgf/cm$^2$: 310
volume mass, kg/m$^3$: 1,500

EXAMPLE 15

A charge is prepared which has the following composition, percent by mass:
barkhan sand: 85
rosin: 8
water-alcohol solution of sodium methylsiliconate of the formula:

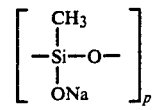

wherein p=2: 7.

The resulting charge is granulated, calcined in an agglomeration machine at the temperature of 1,300° C. The calcined material is crushed and screened.

The resulting calcined material has the following physico-mechanical characteristics:
volume bulk mass of fractions with the particle size (mm):
20–40: 500 to 550 kg/m$^3$
10–20: 550 to 600 kg/m$^3$
5–10: 600 to 700 kg/m$^3$
1.25–5: 750 to 800 kg/m$^3$
below 1.25: 900 to 1,200 kg/m$^3$
Compression strength, kgf/cm$^2$: 38 to 45
Frost-resistance, mass loss, %: 0.6
Silicate decomposition, %: 0.5.

The calcined material is mixed with cement in the amount of 38% by mass of the calcined material. To the resulting mixture water is added in the amount of 18% by mass of the total of the calcined material and cement.

The resulting concrete has the following physico-mechanical characteristics:
compression strength after 28-days' hardening under normal temperature and humidity conditions, kgf/cm$^2$: 300
volume mass, kg/m$^3$: 1,550.

What is claimed is:

1. A process for producing concrete comprising mixing barkhan sand with a fuel selected from the group consisting of a liquid fuel and a solid fuel, and with a plastic binder selected from the group consisting of clay, loess, loam and surfactant which liquifies and reduces water-consumption of the composition, said plastic binder being present in an amount sufficient to provide for granulation of said sand and said fuel and, the components of the mixture being in the following proportions in percent by weight:
barkhan sand: 95 to 30
fuel: 3 to 20
plastic binder: 2 to 60;
granulating the resulting charge; calcining the granules at a temperature ranging from 1,000° to 1,600° C.; crushing the calcined material; mixing the crushed material with cement and water, cement being used in an amount of from 10 to 100% by means of the calcined material and water in an amount of from 10 to 60% by mass of the total of the calcined material and cement.

2. The process as claimed in claim 1, wherein the fuel is a liquid fuel selected from the group consisting of diesel fuel, mazout, coal-tar, lignite, peat, shale and wood resins.

3. The process as claimed in claim 1, wherein as the fuel is a solid fuel selected from the group consisting of coal, lignite, anthracite, semi-anthracite and coke.

4. The process as claimed in claim 1, wherein said plastic binder includes a surfactant capable of liquifying the charge composition and reducing its water consumption selected from the group consisting of naphtha soap which is sodium soap of water-insoluble organic acids recovered from wastes of the alkali purification of kerosene, gasoil and solaroil petroleum distillates; acidol which is petroleum acid recovered from alkaline wastes of purification of oil and solaroil distillates, resin produced from abietic resin by treatment thereof with caustic soda; methylhydrosiloxane polymer of the formula:

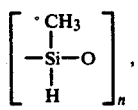

wherein n=15 to 20, aqueous-alcoholic solutions of sodium ethylsiliconate of the formula:

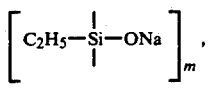

wherein m=1-2, aqueous-alcoholic solutions of sodium methylsiliconate of the formula:

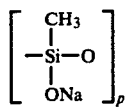

wherein p=1-2; sulphite-alcoholic slops and sulphite-yeast mash and by-products resulting from processing of sulphate-pulp liquors into ethanol and yeast containing principally calcium salts of ligno-sulphonic acids.

5. The process as claimed in claim 1 in which said plastic binder is selected from at least one member of the group consisting of clay, loses and loam.

6. The process according to claim 5 in which said plastic binder is mixed with said sand and fuel in an amount of about 30 to 60 percent by weight based on the total weight of the mixture of sand, fuel and binder.

7. The process as claimed in claim 1 in which said plastic binder is comprised of said surfactant which liquifies and reduces water-consumption of the mixture of sand and fuel.

8. The process as claimed in claim 1 in which said plastic binder is selected from a member of the group consisting of naphtha soap, acidol; resin obtained by neutralizing abietic resin with caustic soda;methylhydrosiloxane polymer of the formula

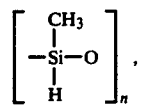

wherein n=15 to 20; sodium ethylsiliconate of the formula [C$_2$H$_5$—Si—ONa]$_m$, wherein =1 to 2; sodium methylsiliconate of the formula

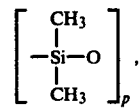

wherein p=1 to 2 and sulfite-alcohol and sulfite-yeast byproduct obtained from processing sulfite-pulp liquor into ethanol and yeast and containing principally calcium salts of lignosulfonic acids.

9. The process as claimed in claim 4, 7 or 8 in which said plastic binder is mixed with said sand and fuel in an amount of about 2 to 18 percent by weight based on the weight of the mixture of sand, fuel and binder.

10. A process for producing aggregate useful for making concrete comprising mixing barkhan sand with a fuel selected from the group consisting of a liquid fuel and a solid fuel, and with a plastic binder selected from the group consisting of clay, loess, loam and surfactant which liquifies and reduces water-consumption of the composition, said plastic binder being present in an amount sufficient to provide for granulation of said sand and said fuel and the components of the mixture being in the following proportions in percent by weight:
barkhan sand: 95 to 30
fuel: 3 to 20
plastic binder: 2 to 60;
granulating the resulting charge; calcining the granules at a temperature ranging from 1,000° to 1,600° C., and crushing the calcined material.

11. The process as claimed in claim 10 in which said plastic binder is selected from at least one member of the group consisting of clay, loess and loam.

12. The process according to claim 11, in which said plastic binder is mixed with sand and fuel in an amount of about 30 to 60 percent by weight based on the total weight of the mixture of sand, fuel and binder.

13. The process as claimed in claim 10, in which said plastic binder is comprised of said surfactant which liquifies and reduces water-consumption of the mixture of sand and fuel.

14. The process as claimed in claim 10 in which said plastic binder is selected from a mixture of the group consisting of naphtha soap, acidol; resin obtained by neutralizing abietic resin with caustic soda;methylhydrosiloxane polymer of the formula

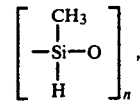

wherein n=15 to 20; sodium ethylsiliconate of the formula [C$_2$H$_5$—Si—ONa]$_m$, wherein m=1 to 2; sodium methylsiliconate of the formula

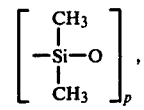

wherein p=1 to 2 and sulfite-alcohol and sulfite-yeast byproduct obtained from processing sulfite-pulp liquor into ethanol and yeast and containing principally calcium salts of lignosulfonic acids.

15. The process as claimed in claim 13 or 14 in which said plastic binder is mixed with said sand and fuel in an amount of about 2 to 18 percent by weight based on the weight of the mixture of sand, fuel and binder.

* * * * *